(No Model.) 2 Sheets—Sheet 1.

L. P. BUNCE.
CLOSED CONDUIT FOR ELECTRIC RAILWAYS.

No. 482,993. Patented Sept. 20, 1892.

Witnesses.
C. E. Van Dorn
F. F. Lyon

Inventor,
Levi P. Bunce.
By Paul & Merwin Att'ys.

(No Model.) 2 Sheets—Sheet 2.

L. P. BUNCE.
CLOSED CONDUIT FOR ELECTRIC RAILWAYS.

No. 482,993. Patented Sept. 20, 1892.

Witnesses.
C. E. Van Doren
F. F. Lyon

Inventor,
Levi P. Bunce.
By Paul & Merwin Att'ys.

UNITED STATES PATENT OFFICE.

LEVI P. BUNCE, OF MINNEAPOLIS, MINNESOTA, ASSIGNOR OF ONE-EIGHTH TO WILLIAM HEGGUM, OF SAME PLACE.

CLOSED CONDUIT FOR ELECTRIC RAILWAYS.

SPECIFICATION forming part of Letters Patent No. 482,993, dated September 20, 1892.

Application filed September 10, 1891. Serial No. 405,273. (No model.)

*To all whom it may concern:*

Be it known that I, LEVI P. BUNCE, of Minneapolis, in the county of Hennepin and State of Minnesota, have invented certain Improvements in Underground Conduits for Electric Roads, of which the following is a specification.

The object of this invention is to provide an improved conduit, which may be located entirely below the surface of the street or ground, and within which may be arranged an electric conductor or conductors, through which an electric current may be supplied to the motors upon electric cars by means of a suitable trolley carried by the said cars and arranged to make contact with the conductor in said conduit.

Another object of the invention is to provide means for closing the conduit, so as to exclude the dirt, dust, and water, while at the same time providing means to permit the closing device to open sufficiently to allow for the passage of the trolley-arm.

Another object of the invention is to provide an improved conductor to be used in connection with this conduit and to be supported therein in position to be engaged by the trolley.

Another object of the invention is to provide means for receiving and holding the dust, dirt, and water that may enter the main conduit and prevent it from entering the supplemental conduit or that portion within which the electric conductor is arranged.

Figure 1:
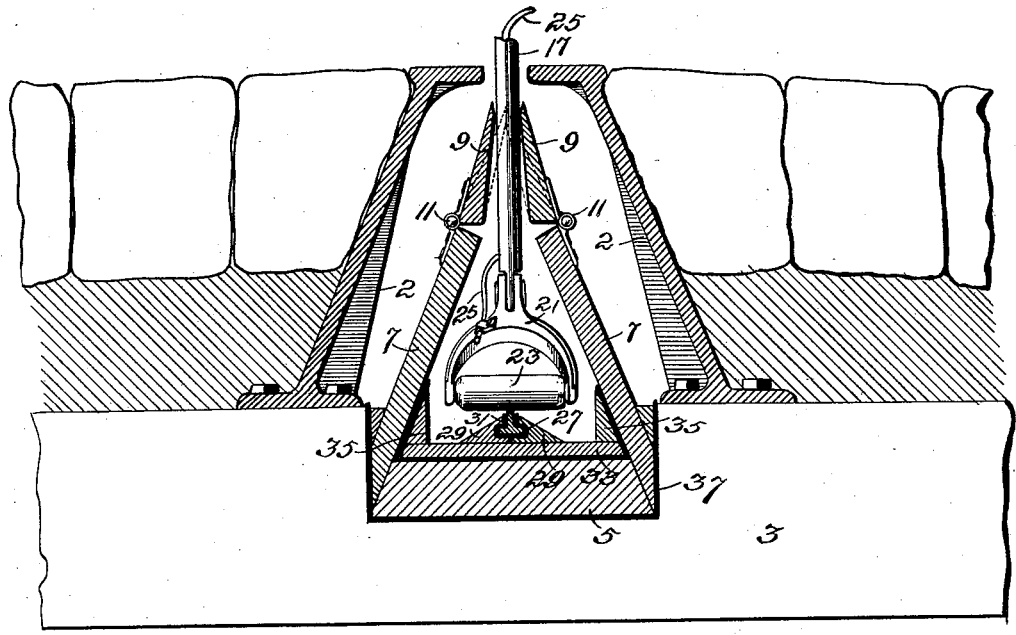
Figure 2:
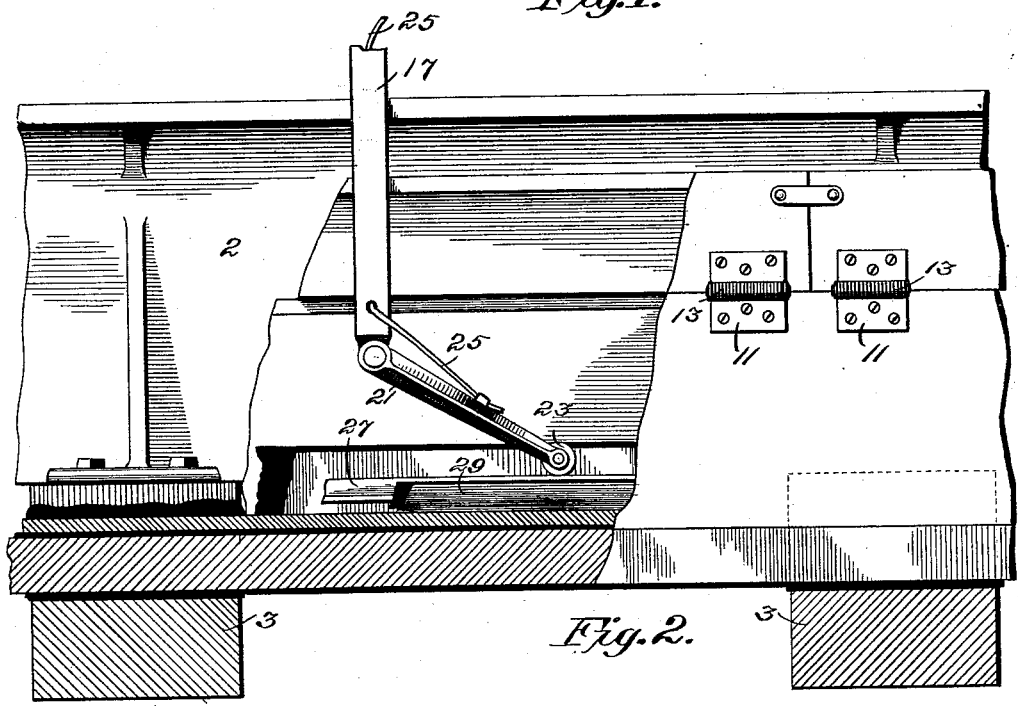
Figure 3:
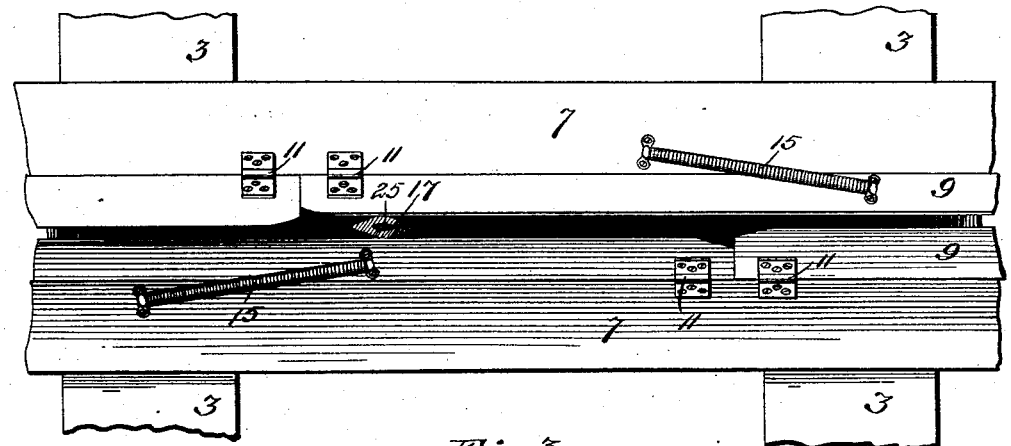
Figure 4:
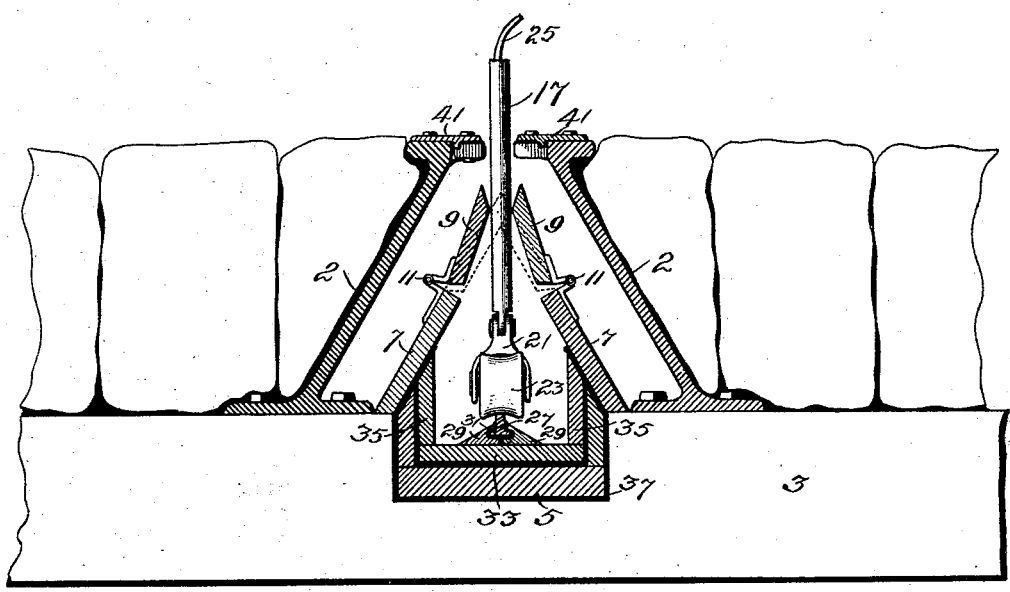

In the accompanying drawings, forming a part of this specification, Figure 1 is a transverse vertical section of my improved device. Fig. 2 is a side elevation of the same, partly in section. Fig. 3 is a plan view of a portion of the inner or supplemental conduit, showing the trolley-arm therein and the position that the parts assume in order to permit the trolley-arm to pass. Fig. 4 is a transverse vertical section showing a slightly-modified construction.

In the drawings, 2 represents the main conduit, which may be of any ordinary or preferred construction and the parts of which are preferably supported upon the ties 3 in any suitable manner. This conduit is preferably arranged with a narrow slot between the sides thereof at the top in the usual way. Within the conduit 2 is arranged what I designate as the "inner" or "supplemental" conduit, within which is located a suitable electric conductor, through which the current is supplied. This conduit is preferably provided with the bottom 5, which may be arranged in suitable recesses formed in the ties 3, and with the inclined sides 7, that approach each other near the top, and are provided at their upper edges with the hinged plates 9. These plates are preferably made thin at their upper edges, and they are secured to the sides 7 of the conduit by means of the hinges 11, which may be provided with suitable springs 13, by which the plates will be held normally with their upper edges in contact with each other, thereby closing the top of the conduit and forming a sharp upper edge that comes directly beneath the slot in the main conduit. This upper edge of the supplemental conduit, being placed directly beneath the slot in the outer or main conduit, causes the dust, dirt, and water or snow that passes through the slot of the main conduit to be deflected and pass down into the spaces between the two conduits, thus preventing any of this material from entering the inner or supplemental conduit.

Instead of providing the plates of the inner conduit with spring-hinges, as shown in Figs. 1 and 2, I may provide them with independent spings 15, as shown in Fig. 3, these springs being secured to the sides of the inner conduit and to said plates, as shown in Fig. 3.

I prefer to provide a series of plates for each side of the supplemental conduit, as shown in Fig. 3. These plates may be of any suitable length, and they are preferably provided with rounded corners, and the plates are arranged so that the joints between the plates do not come opposite each other, as shown in said Fig. 3.

The trolley-arm 17 is arranged to extend through the slot in the main conduit and to pass between the plates 9, and it is preferably of beveled form, as shown in Fig. 3, so that it separates or opens the plates 9 as said trolley-arm passes along the conduit. The trolley-arm is preferably provided with a yoke 21, pivoted thereto, as shown in Fig. 2, and the lower ends of this yoke have journaled therein a roll 23, which rests upon the conductor in the supplemental conduit. This roll is preferably of sufficient length, so that the trolley-arm may have considerable side movement without permitting said roll to pass off from the conductor. A conductor 25 preferably passes through the trolley-arm and is connected to the yoke 21, as shown in Figs. 1 and 2. The roll 23 is preferably sufficiently small in diameter and the yoke 21 sufficiently small in cross-section to permit these parts to be passed out of the conduit when they are turned to a position at right angles to that which they normally occupy. When it is desired to remove the trolley from the conduit, the trolley-arm is given a partial turn, so as to bring the roll into a position lengthwise of the conduit, and then the yoke and the roll are drawn up and out of the conduit.

The conductor that I prefer to use consists, preferably, of a T-rail 27, arranged with the flange portion downward between suitable rail-supports 29 and inclosed by a suitable non-conductor 31. The rail-supports 27 rest upon a plate 33, and said plate and the blocks 35, by means of which it is secured in position, are also preferably insulated from the bottom and sides of the inner or supplemental conduit. Suitable insulating material 37 may also be arranged surrounding the lower part of the supplemental conduit.

I preferably form the inner or supplemental conduit of wood, though it may, of course, be formed of any other suitable material. I may provide the main conduit with removable plates 41, which upon being removed will permit the trolley-arm to be withdrawn without being turned around, and in this case I may use a short roll 23, that is considerably larger in diameter than that shown in Figs. 1 and 2, as shown in Fig. 4.

The details of the construction and arrangement may be changed or altered at will without departing from my invention.

I claim as my invention—

1. The combination, with the main conduit provided with an opening through which a trolley-arm may extend, of a supplemental conduit arranged in said main conduit and provided with a series of hinged plates closing the opening in said supplemental conduit, said plates being arranged to break joints with one another, substantially as described.

2. The combination, with a main conduit provided with an opening through which a trolley-arm may pass, of a supplemental conduit arranged therein and provided with inclined outer walls and having an opening through which the trolley-arm may pass, an electric conductor arranged in said supplemental conduit, and a series of plates hinged to the walls of said supplemental conduit and arranged to meet at an angle beneath the opening in the main conduit and provided with beveled upper edges, whereby when said plates are brought together they form a sharp angle, so as to prevent dust, dirt, or water passing through the opening in the main conduit from lodging upon the edges of said plates.

3. The combination, with the main conduit provided with an opening through which a trolley-arm may pass, of a supplemental conduit arranged in said main conduit and provided with inclined outer walls and having an opening through which a trolley-arm may pass, an insulated conductor arranged in said supplemental conduit, and a series of plates hinged to the walls of the supplemental conduit and having beveled upper edges, whereby when said plates are closed they form a sharp angle beneath the opening in the main conduit, said plates being arranged to break joints with one another, substantially as described.

4. The combination, with the conduit provided with a slot adapted to permit a trolley-arm to enter therein, of a supplemental conduit arranged therein, with inclined outer walls and with a space between the outer walls of the supplemental conduit and the inner walls of the main conduit, and with a series of hinged plates secured to the walls of the supplemental conduit and provided with beveled upper edges forming when closed a sharp edge beneath the opening in the main conduit, said plates being arranged to break joints with one another, substantially as described.

5. The combination, with a conduit provided with the inclined walls 7, of the series of plates 9, provided with beveled upper edges, hinged to said walls 7 and arranged to close the opening in said conduit, said plates being arranged to break joints with one another and forming when closed a sharp upper edge, means for holding said plates normally in a closed position, and an electric conductor arranged within said conduit.

6. The combination, with the main conduit provided with a slot or opening adapted to permit a trolley-arm to enter therein, of a supplemental conduit arranged in said main conduit and provided with inclined walls 7, provided with a series of hinged plates 9, secured to the upper edges of said walls and forming when closed a sharp upper edge to said conduit, a suitable trolley-arm projecting through the opening in said conduits and having secured thereto a yoke 21, with a roll 23 journaled in said yoke, the length of said roll being greater than the distance between the upper edges of the slots of the supplemental conduit, and an insulated conductor arranged in said supplemental conduit with which said roll is adapted to make contact, substantially as described.

In testimony whereof I have hereunto set my hand this 5th day of September, 1891.

LEVI P. BUNCE.

In presence of—
F. S. Lyon,
C. E. Van Doren.